United States Patent [19]
Tucker

[11] 3,928,101
[45] Dec. 23, 1975

[54] METHOD OF FABRICATING A ROLLING DIAPHRAGM SEAL

[75] Inventor: Jerry Tucker, Waco, Tex.

[73] Assignee: Rockwell International Corporation, El Segundo, Calif.

[22] Filed: Mar. 7, 1974

[21] Appl. No.: 449,178

[52] U.S. Cl. ............... 156/156; 156/165; 156/286; 156/294; 156/309
[51] Int. Cl.² ......................................... B65C 3/26
[58] Field of Search ........... 156/156, 165, 285, 287, 156/381, 382, 475, 494, 496, 294, 293, 309, 286; 285/225

[56] References Cited
UNITED STATES PATENTS

| | | | |
|---|---|---|---|
| 2,330,104 | 9/1943 | Antonelli | 156/192 |
| 3,184,357 | 5/1965 | Kaspar | 156/165 |
| 3,218,211 | 11/1965 | Taylor et al. | 156/293 |

FOREIGN PATENTS OR APPLICATIONS

| | | | |
|---|---|---|---|
| 636,237 | 2/1962 | Canada | 156/294 |

Primary Examiner—William A. Powell
Assistant Examiner—Brian J. Leitten
Attorney, Agent, or Firm—L. Lee Humphries; Robert G. Upton

[57] ABSTRACT

A circular rolling diaphragm seal for retaining pressures in excess of 2500 p.s.i. while remaining flexible in a widely varying temperature environment is constructed of two or more one-piece layers of a tubular stockinet cloth material bonded to two or more layers of an ethylene-propylene terpolymer elastomer based tubular material, the multi-layered composite structure being cured and subsequently formed on a rolling diaphragm forming mandrel.

8 Claims, 7 Drawing Figures

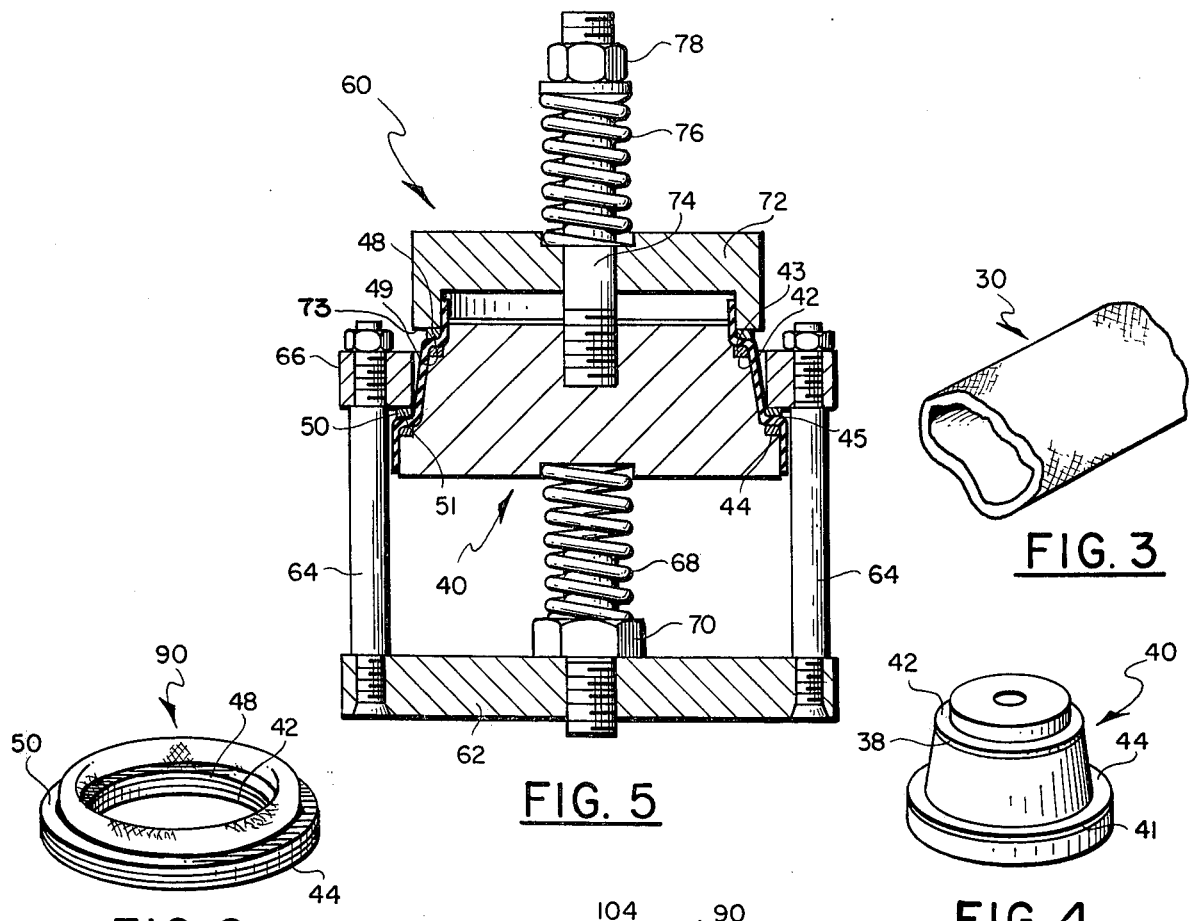
FIG. 3
FIG. 5
FIG. 4
FIG. 6
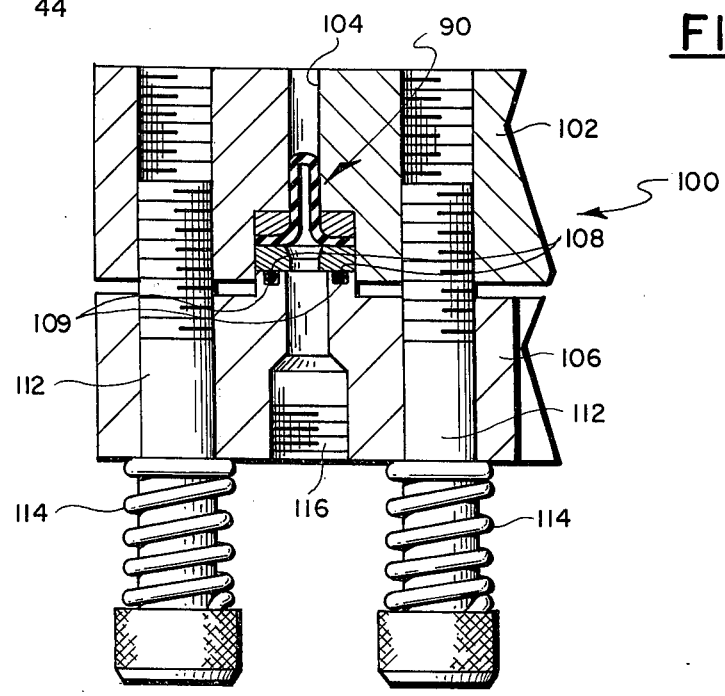
FIG. 7

METHOD OF FABRICATING A ROLLING DIAPHRAGM SEAL

BACKGROUND OF THE INVENTION

1. Field of the Invention

This invention relates to the field of flexible seals and methods for their fabrication. More particularly, the invention deals with a combination of materials employed to successfully fabricate a flexible rolling diaphragm seal that will retain a pressure in excess of 2500 p.s.i. while remaining flexible in a hostile environment commonly associated with rocket engines.

2. Description of the Prior Art

A number of prior patents deal with the fabrication of seals in general and a few patents deal specifically with rolling diaphragm type seals. For example, an invention by J. F. Taplin, U.S. Pat. No. 3,083,734 discloses a rolling diaphragm seal which is fabricated from a flat loomed or woven fabric that is placed across a female die mold, the fabric being subsequently pressed into the mold by a male plunger which conforms generally to the shape of the female die portion. An elastomeric layer permeates the fabric, thus sealing the weave of the fabric. An additional plunger forces the fabric into a recess in the male die portion thereby reorienting the warp of the thread in the fabric. The seal, however, is not designed to withstand substantial pressure gradients across the seal. The seal of the above described invention differs from the present invention in that it is fabricated from a flat piece of material, while the seal of the instant invention is fabricated from multi-layers of stockinet material bonded to multi-layers of a rubber-like tubular material, which is formed on a mandrel. The composite structure of the present invention has no seams, yet is flexible in a hostile environment which includes relatively high pressures and varying temperatures.

A patent issued to Pierson, U.S. Pat. No. 1,622,048, discloses a method of fabricating a laminated disc or the like. A circular flat forming disc is utilized wherein a layer of cloth is applied 90° to the edge of the disc. The layer of cloth is lapped over the disc whereby the cloth is 50 percent above and 50 percent below the plane of the disc. Rollers adjacent each face of the forming disc force the fabric into the disc. A vulcanized rubber binder is then worked into the fabric. The rubber permeated fabric wrapped about the two faces of the disc may then be layered and cured into a laminated structure. After curing the fabric on the disc, the fabric is separated by cutting along the edge of the disc, thus forming two finished laminated segments that may be utilized as a seal, gasket or the like. The present invention distinguishes over this patent in that a rolling diaphragm seal is fabricated from layers of tubular woven stockinet material applied to layers of a rubber base sleeve that is formed on a forming mandrel.

U.S. Pat. No. 3,365,203 to Wallis discloses a rolling-type diaphragm seal comprised of a layer of elastomeric material laminated to a second layer of elastomeric material having axially aligned reinforcing filament wires between the layers. While the rolling diaphragm seal is restrained and reinforced in the axial direction, there is no method to contain very high pressures across the seal as there is disclosed in the instant invention.

All of the above prior art patents are disadvantaged in that they cannot contain high pressures in a high temperature environment. The present invention not only contains pressures above 2500 p.s.i., but remains flexible in varying temperature ranges commonly associated with rocket engines and the like.

SUMMARY OF THE INVENTION

A rolling diaphragm seal is fabricated from two or more plies of tubular cloth such as a stockinet-type of material having two or more layers of, for example, ethylene, propylene, terpolymer-based rubber composition placed between layers of stockinet material.

A tooling fixture is required to cure the multi-plied composite material prior to forming the cured material into the final rolling diaphragm seal configuration.

A layer of the rubber-based composition is placed over a non-metallic elastomeric expandable, i.e., silicone thin-walled cylindrically shaped bladder followed by a layer of tubular cloth stockinet material. Alternate layers of each are applied, one upon the other, until the desired seal thickness is reached. The elastomeric bladder with the composite seal material thereon is placed within a heavy-walled tube. The ends of the heavy-walled tube are subsequently sealed off so that the tube will retain pressure. One end of the tube has a pressure fitting therein so that the interior of the thin-walled bladder may be pressurized while the area between the outside wall of the inner bladder and the inner wall of the adjacent heavy wall cylinder is evacuated by a vacuum pump connected through the heavy-walled cylinder. The layers of composite seal material between the bladder and the metal cylinder are compacted or squeezed together by a combination of internal pressure inside the bladder and by the vacuum created between the bladder and the outside cylinder. The whole pressurized and evacuated assembly fixture is then placed in an oven for a predetermined time span at elevated temperatures to cure the multi-layered composite seal material together.

The cured material is subsequently removed from the fixture and is now ready to be stretched over a seal forming drum or mandrel. The forming drum is so configured to form inner and outer shoulders for the rolling diaphragm seal. The inner shoulder accommodates one of a pair of seal attachment rings and the outer shoulder accommodates one of a pair of outer attachment rings. The rings are prepared for attachment to the cured material by applying a thin coat of an uncured elastomer on one face of the rings. The prepared inner and outer attachment rings are then placed on the forming drum, followed by stretching the composite cured seal material over the drum with the rings in place. The remaining inner and outer attachment rings are clamped in place, sandwiching the seal material between pairs of attachment rings.

The drum assembly with attachment rings in place is then cured in an oven for a predetermined time span and temperature to bond the rings to the seal material. The rolling diaphragm seal is now ready for use.

Therefore, it is an object of this invention to provide a method of fabrication of a seal that will remain flexible in a high pressure environment.

More specifically, it is an object of this invention to provide a method of fabrication of a multi-layered rolling diaphragm seal that will remain flexible in a high pressure and a widely varying heat environment commonly associated with rocket engines.

Accordingly, one advantage over the prior art is there are no seams in the completed rolling diaphragm seal.

Another advantage over the prior art is the capability to retain pressures for a considerable period of time, up to 3000 p.s.i.

Yet another advantage over the prior art is the ability to remain flexible in a widely varying heat environment, thus providing for example, directional control for a gimbled rocket engine or the like.

The above-noted objects and advantages of the present invention will be more fully understood upon a study of the following detailed description in conjunction with the detailed drawings.

BRIEF DESCRIPTION OF THE DRAWINGS

FIG. 3 is a perspective view of a multi-layered cured tubular seal material prior to forming the material into the final rolling diaphragm seal configuration, FIG. 4 is a perspective view of the seal forming mandrel with an inner ring and an outer ring in place on the stepped shoulders of the mandrel, FIG. 5 is a cross-sectional view of the forming mandrel fixture with the composite multi-layered seal material stretched over the mandrel with the pairs or inner and outer rings sandwiching the seal material therebetween, FIG. 6 is a perspective view of the finished rolling diaphragm seal illustrating the inner and outer mating surfaces of the seal, and FIG. 7 is a partially cut-away cross-sectional view of a seal test fixture with the seal in place.

DESCRIPTION OF THE PREFERRED EMBODIMENTS

Figure 1:
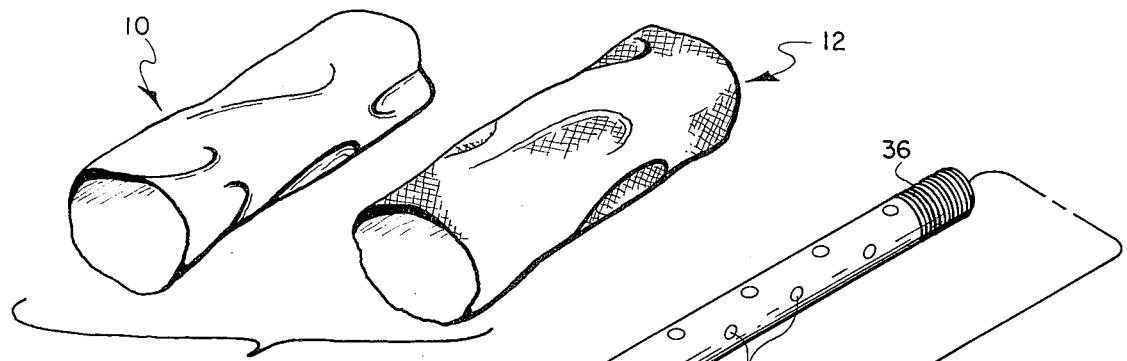
FIG. 1 is a perspective view of the separate basic materials used to fabricate the seal comprising a tubular stockinet sleeve and a rubber sleeve readied for the subsequent laminating and curing process.

Referring to FIG. 1, the tubular material generally designated as 10 is a rubber membrane composition consisting primarily of a polymer having various ingredients therein. An example of the rolling diaphragm seal membrane composition includes the following ingredients: a polymer such as Nordel 1040 manufactured by the E. I. duPont Corporation of Wilmington, Delaware or other similar polymers manufactured by, for example, the ENJY Chemical Corporation, Standard Oil of New Jersey or the Uniroyal Corporation of Akron, Ohio, may be used. For every hundred units of, for example, the Nordel 1040 polymer material, 50 units of a carbon black material such as that manufactured under the Trademark "PHILBLACK O" by Phillips Chemical Corporation of Bartlesville, Oklahoma. Other materials include 20 units of processing oil such as that manufactured under the Trademark of "SUMPAR 150" by the Sun Oil Company of Philadelphia, Pa., a Corporation of New Jersey; and 10 units of a Tacifier, such as that manufactured under the Trademark of "WINGTACH 95" by the Goodyear Corporation of Akron, Ohio. One unit of Stearic Acid; 5 units of Zinc Oxide and 1 unit of Sulfur are utilized. These three common "rubber grade" are obtained from the National Bureau of Standards, Washington, D.C. Finally, 0.75 unit of curing accelerators such as that manufactured under the Trademark of "THURIAM M" made by the E. I. duPont Corporation and 1.5 units of Tellurium Diethyl Dithiocarbamate such as that manufactured under the Trademark of "TELLURAC" by the R. T. Vanderbilt Company, Inc. of Akron, Ohio, are added.

The membrane composition 10 is prepared in the following manner. A roll mill (not shown) consisting of adjacent rollers is set with a gap of between 0.040 and 0.080 inch; the preferred gap setting being 0.060. The variable temperature of the water inside the roller cylinder is set at approximately 60°F. The polymer material is bonded on the mill followed by incorporation of the carbon black substance. The zinc oxide and Stearic Acid is then applied to the material on the mill followed by addition of the processing oil and the tacifier material. The curing accelerators are then subsequently added to the rubber-like composition on the mill followed by finally adding the sulfur ingredients by "cutting" from side to side the adjacent rollers of the mill for one to two minutes. The membrane material is then allowed to mill undisturbed for a couple of minutes. The resultant tubular membrane material 10 (as depicted in FIG. 1) is then removed from the mill and allowed to cool.

The woven seamless stockinet material generally designated as 12 consists of, for example, a Dacron (a tradename of I. E. duPont de Nemours & Company, Inc. of Wilmington, Del.) stockinet designated as Style 270/PS manufactured by the Terri Cord Division of Advanced Glove Company of Macon, Georgia. The foregoing material has 105 pounds/inch width tensile strength and is flexible with less than 5 percent elongation and provides a cross-weave which tends to prevent blowthrough.

Figure 2:
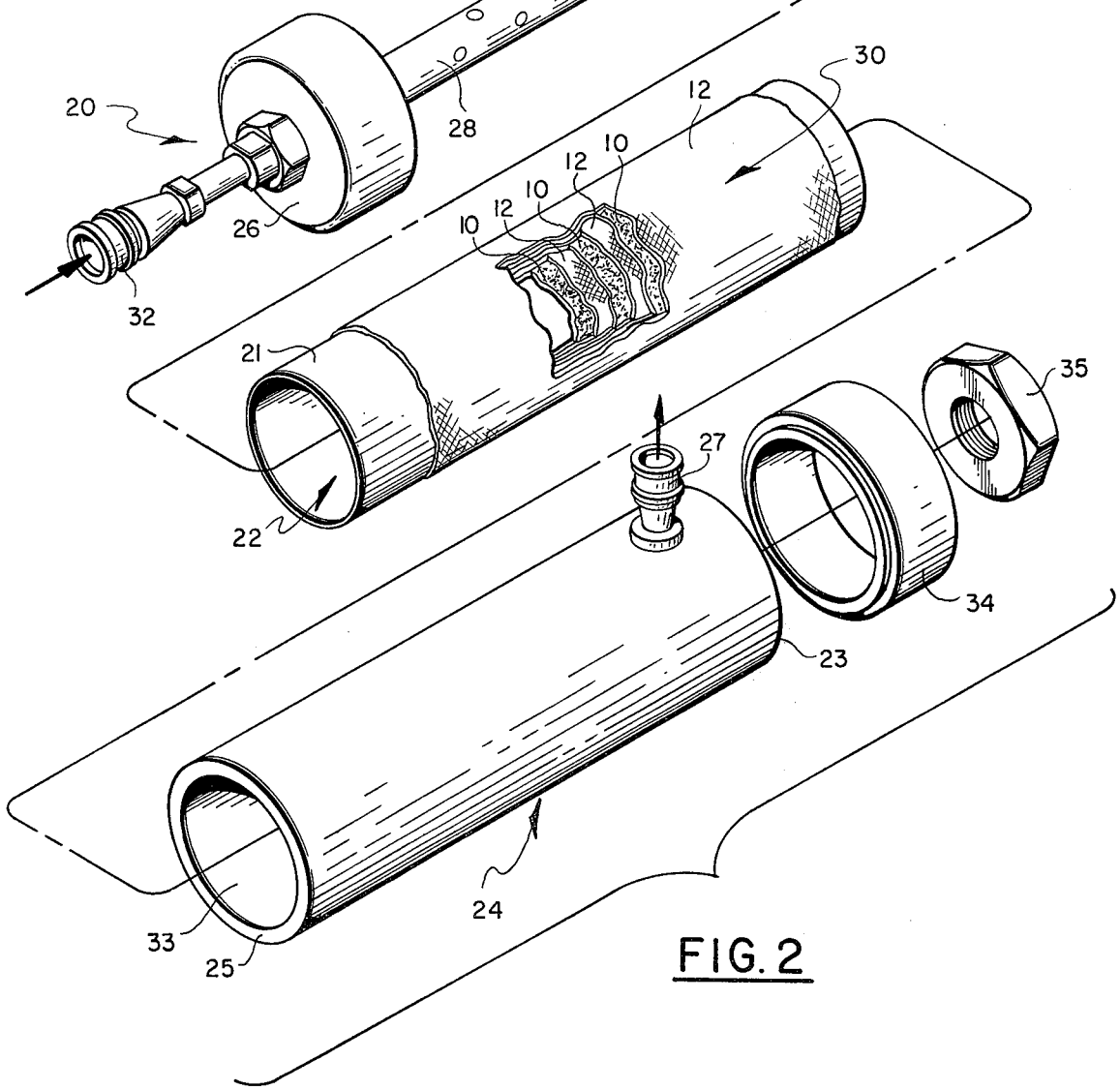
FIG. 2 is an exploded perspective view of the fixture that compacts and cures the tubular multi-layered composite seal structure within the fixture.

Referring now to the exploded perspective view of FIG. 2, a tooling fixture, generally designated as 20 consists of a central pipe 28 that has a quick release pressure fitting 32 on one end which leads through an end cap 26, the pipe extending beyond the end cap has one or more orifices 29 therethrough. The end 36 of the pipe is threaded to accept a retaining nut 35. A thin-walled elastomeric bladder 21 such as a silicone bladder is designed to slip over the pipe 28. The bladder or tube 21 fits concentrically within a Teflon lined heavy-walled tube 24. The tube 24 has a quick release fitting 27 connected through the wall of the tube that leads to a vacuum pump, (not shown). The fixture Company Inc. assembled by slipping the thin-walled tube 21 over the pipe 28 first, followed by sliding the heavy-walled, Teflon lined pipe 24 over the thin-walled tube 21 (Teflon is a tradename and is made from polymers of tetrafluoroethylene manufactured by I. E. duPont de Nemours & Company, Inc. of Wilmington, Del.). End cap 34 is then seated against the end of the heavy-walled pipe 24, followed by threading the nut 35 on to the end 36 of pipe 28. The nut 35 seals off the end of pipe 28, so that the inside of bladder 21 may be pressurized.

The composite seal material preferably is comprised of three layers each of the membrane composition and stockinet material. To start the laminating process, cut three lengths between 10 and 14 inches long, for example, of the tubular polyester stockinet material. Dip coat a 50—50 blend by weight of an adhesion bonding priming aid such as that manufactured under the Trademark of "CHEMLOK 231" by the Hughson Chemical Company of Erie, Pa., "CHEMLOK 231" is a blend of organic polymer, filler and a non-volatile isocyanate curative and a solvent solution such as O-T-620, a military designation which is commonly known as trichloroethylene cleaning solvent. Next band the membrane on a roll mill to form the material to a thickness between 0.010 and 0.020 inch with no perforations. Place one layer of the tubular membrane 10 on the thin-walled silicone bladder 21 followed by a layer of the tubular stockinet material over membrane 10 being careful not to disturbe the underlying membrane. Next apply another layer of the membrane, followed by a second layer of stockinet material repeating the process until the composite structure is comprised of three layers of the membrane material 10 and three layers of the stockinet material 12, (a total of six plies). Obviously different thicknesses can be obtained by reducing or increasing the number of layers. The interior wall of the heavy-walled cylindrical tube 24 is lined with a Teflon or the like material 33 so that it will easily slip over the multiple layers of material. The thin-walled tube 21 with multi-layers of material thereon is slipped over the tube 28 followed by sliding the heavy-walled tube 24 over the layers of material. The assembly is completed by placing end cap 34 adjacent end 23 of tube 24 and screwing the end closure nut 35 in place, providing a closed fixture. Pressure is exerted to the inside wall of tube 21 through tube fitting 32 of tube 28, thus exerting pressure to the inside wall of the tube, forcing the multi-layers of material between the outside wall of tube 21 and the teflon coated inside wall of tube 24. Additional pressure is exerted on the plies or layers of material by connecting a vacuum pump to fitting 27 in outside tube 24 and evacuating all of the air between the outside of tube 21 and the inside wall of tube 24, thus further compressing the layers of material on the thin-walled tube. The method of evacuating the fixture further assures that the membrane is free of pinholes. The inside of tube or bladder 21 is pressurized preferably with an inert gas such as nitrogen to about 200 p.s.i. Approximately 27.5 inches of vacuum is pulled on the assembly 20 by the vacuum system (not shown) for a period of approximately one hour. The simultaneously pressurized and evacuated fixture 20 is then placed into preferably a forced air oven which is set at a temperature of 250° ± 10°F for 120 ± 15 minutes, followed by increasing the temperature in the oven to 370° ± 10°F, the oven being held at that temperature for 120 ± 15 minutes. The assembly is then removed from the oven and allowed to cool before releasing the pressure within the fixture 20. The total desired thickness of the six-plied composite structure when cured is between 0.060 and 0.070 inch.

FIG. 3 is a perspective illustration of the cured multi-plied rolling diaphragm seal material generally designated as 30.

Turning now to FIG. 4, a rolling diaphragm seal forming mandrel is depicted generally designated as 40. The mandrel is so configured to provide an inner circular shoulder 38 designed to accept one of a pair of inner seal attachment rings 42, the mandrel providing an additional larger annular shoulder 41 that is designed to accept one of a pair of larger seal attachment rings 44. To prepare the rings 42 and 44 for attachment to the tubular rolling diaphragm seal material 30, one side of each of the rings is sandblasted, followed by degreasing the rings. The sandblasted side subsequently is primed with a 50-50 by weight mixture of Chemlok 231 and trichloroethylene. The rings are then allowed to dry for approximately 20 minutes. A sheet of the membrane composition 10 is prepared in a rolling mill to a thickness of 0.025 ± 0.005 inch. The sheet of material is then pressed to the prime side 43 of inner ring 42 and side 45 of outer ring 44, thus providing a layer of membrane material that will form a bond to the rolling diaphragm seal composite material 30. Rings 42 and 44 are placed over the mandrel 40 with the prepared faces 43 and 45 facing outwardly. A section of a tubular composite rolling diaphragm seal material 30 is stretched over the mandrel with the rings 42 and 44 in place. The mandrel is now ready for insertion into a special seal forming jig 60.

Referring to FIG. 5, a seal forming jig fixture generally designated as 60 is depicted and is especially designed to accommodate mandrel 40. Before the fixture is assembled the mandrel 40 is first prepared as follows: Seal attachment rings 48 and 50 are prepared as previously described relative to rings 42 and 44 wherein their respective faces 49 and 51 are sandblasted and coated with the membrane material 10. Before the outer-inner seal rings 48 and 50 are attached to the composite material 30, the exposed stockinet layer (the outside layer) is prepared where the rings are to attach to the stockinet material. The effected areas of the stockinet material are treated with Chemlok 231 and allowed to dry for approximately 30 minutes at room temperature. The mating inner and outer rings 48 and 50 are placed over the adjacent rings 42 and 44, thus sandwiching the layered composite seal material 30 therebetween. The mandrel 40 is suspended over base 62 of fixture 60 by spring 68. A series of support arms 64 surround the mandrel 40. A clamping ring 66 slips over the support rod 64 so that the inner shoulder of the clamping ring 66 rests adjacent to the face of the outer ring 50, thus forcing ring 50 against ring 44, thereby bonding the seal material 30 to the rings. The force of spring 68 applies an even pressure to the mandrel 40 so that rings 50 and 44 are securely clamped to the intermediate composite seal material 30. The inner rings 42 and 48 are similarly locked in place by a clamping ring 72 which is centered by pin 74, the outer rim 73 being forced against the outer face or surface of ring 48 by spring 76. Spring 76 is held in place by retaining nut 78. By adjusting the nut 78 downwardly more pressure is applied to ring retaining mandrel 72. Similarly, more pressure is applied to mandrel 40 by adjusting nut 70 surrounding the inner shaft of support spring 68. The whole assembly fixture 60, with mandrel 40 entrapped therein, is placed in preferably a forced air oven for approximately two hours at 320°F. The fixture is then removed from the oven and allowed to cool before disassembly. After the fixture has cooled, the rolling diaphragm seal stretched over mandrel 40 is removed from the fixture. The seal is then lifted from mandrel 40. The excess material around the outer periphery of rings 42, 48 and 44, 50 is removed thus completing the rolling diaphragm seal. As can be seen in FIG. 6 the inner rings 42 and 48 are pushed downwardly so that the inner and outer rings are on the same plane, composite material 30 thereby forming a U-shaped configuration. The finished rolling diaphragm seal 90 is subsequently placed within a pressure test fixture generally designated as 100 as depicted in FIG. 7.

Test fixture 100 is comprised of a base portion 102 that has machined therein, a seal support cavity 104 that is designed to accept the finished diaphragm seal 90. Seal 90 is placed within the support cavity 104 and covered by a clamping ring 106 that is placed over the top of the seal. A pair of lands 108 are designed to accept "O" rings 109 thus effecting a seal between the rolling diaphragm seal and the face plate 106. Support bolts 112 are secured to the base plate 102 through face plate 106. The support bolts have surrounding springs 114 to provide pressure to face plate 106, thus sealing rolling diaphragm seal 90 securely in place. A pressure cavity 116 communicates with a pressure source (not shown) thus providing a means to pressurize the rolling diaphragm seal to assure that there are no leaks or deformities.

The rolling diaphragm seal fabricated from the above described preferred methods will withstand pressures in excess of 2500 p.s.i. as well as temperatures in the range of from −40°F to +170°F while still remaining flexible, thus enabling, for example, a solid rocket engine to gimble thereby providing a means to vector the engine while maintaining a pressure seal between the engine and the vehicle attached thereto. The internal combustion temperature in the engine can run as high as 5000°F.

It will of course be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. A method of fabricating a composite seal material for a flexible rolling diaphragm seal capable of retaining pressures up to 3000 psi in a temperature range between −40°F to 170°F in an operating system such as a rocket engine, the composite seal fabrication process comprises the steps of:

rolling a sheet of rubber material in a tubular form on a rolling mill, and cutting said tubular form to two or more equal lengths previously selected, cutting two or more lengths of seamless tubular woven cloth to substantially correspond to the previously cut lengths of said rubber material, sliding one of said lengths of said tubular rubber material over a thin-walled flexible tube bladder, alternately sliding a length of said tubular cloth followed by a length of said rubber material over the tube bladder, building up a composite material to a desired thickness, sliding said tube bladder with said alternate layers of said composite material thereon into a heavy-walled pressurizable cylinder, pressurizing the interior of said flexible tube bladder to compress said alternate layers of material between the outside wall of said flexible bladder and the inside wall of said heavy-walled cylinder, evacuating the space between said outside wall of said flexible bladder and the inside wall of said heavy-walled cylinder by vacuum pump means to further compress said alternate layers of material on said bladder to a uniform thickness, heating said pressurized cylinder containing said bladder and said alternate layers of composite material in a heated oven for approximately 240 minutes at temperatures ranging from 250°F to 370°F to fuse and cure said layers of material into said flexible composite seal material on the bladder, and removing said cured composite seal material from said tube bladder, and bonding at least a pair of seal attachment rings to said composite seal material to facilitate mounting in place, the flexible composite seal material so prepared for retaining said pressure and said temperatures in said operating system.

2. The method as set forth in claim 1 further comprising the steps of:

placing one of a matching pair of inner seal attachment rings and one of a matching pair of outer seal attachment rings onto a rolling diaphragm seal forming mandrel, said mandrel forming inner and outer shoulders on separate parallel planes to support one each of said pairs of inner and outer seal attachment rings thereon, stretching said cured flexible composite seal material over said mandrel with said rings positioned on said shoulders, placing the second of said matching inner and outer seal attachment rings over said flexible composite seal material on said mandrel thereby sandwiching said composite seal material between said pairs of matching inner and outer seal attachment rings, and placing said mandrel with said flexible composite seal material and said seal attachment rings in place on said mandrel, into a furnace to fuse said seal attachment rings to said composite material.

3. The method as set forth in claim 2 wherein said seal attachment rings are sandblasted on one face of each of said rings, followed by priming with a bonding agent comprised of a 50—50 by weight mixture of an adhesion bonding primer consisting of a blend of organic polymer, filler and a non-volatile isocyanate curative and trichloethylene, a polymer membrane composition is then applied to said primed seal attachment rings, said rings subsequently being bonded to said flexible composite material stretched over said mandrel.

4. The method as set forth in claim 2 wherein said mandrel with said flexible composite material and said seal attachment rings in place on said mandrel are placed into a forced air oven for approximately 120 minutes at approximately 320°F.

5. The method as set forth in claim 1 wherein said rubber material consists primarily of 100 units of a polymer material, 20 units of a processing oil, 10 units of a tacifier, 1 unit of stearic acid, 5 units of zinc oxide, 1 unit of sulfur and 2.25 units of curling accelerators.

6. The method as set forth in claim 1 wherein said seamless tubular woven cloth material is fabricated from a polyester fiber made from polyethylene terephthalate.

7. The method as set forth in claim 1 wherein the alternating layers making up the flexible composite seal material is comprised of three layers of tubular rubber material and three layers of tubular woven cloth material, said compressed and cured seal material having a thickness between 0.060 and 0.070 inch.

8. The method as set forth in claim 1 wherein said pressurized cylinder containing said flexible tube bladder and said composite alternating layers of material are heated in a forced air oven set at a first temperature of 250° ± 10°F for 120 ± 15 minutes, followed by increasing the temperature in said oven to a second temperature of 370° ± 10°F, said oven being held at said second temperature for 120 ± 15 minutes.

* * * * *

UNITED STATES PATENT OFFICE
CERTIFICATE OF CORRECTION

PATENT NO. : 3,928,101
DATED : Dec. 23, 1975
INVENTOR(S) : Jerry Tucker

It is certified that error appears in the above-identified patent and that said Letters Patent are hereby corrected as shown below:

Column 4, line 27 after "stockinet" insert --is made from a polyester fiber of polyethylene terephthalate and is--;
Column 4, line 47 delete "Company Inc." and insert --is--.

Signed and Sealed this first Day of June 1976

[SEAL]

Attest:

RUTH C. MASON
Attesting Officer

C. MARSHALL DANN
Commissioner of Patents and Trademarks